(12) United States Patent
Chen

(10) Patent No.: US 7,619,840 B2
(45) Date of Patent: Nov. 17, 2009

(54) MULTI-IMAGE RETRIEVING SYSTEM

(76) Inventor: Wen-Ching Chen, No. 170-3, Cingsong St., Dali City, Taichung County 412 (TW)

( * ) Notice: Subject to any disclaimer, the term of this patent is extended or adjusted under 35 U.S.C. 154(b) by 65 days.

(21) Appl. No.: 11/892,159

(22) Filed: Aug. 20, 2007

(65) Prior Publication Data

US 2009/0052065 A1     Feb. 26, 2009

(51) Int. Cl.
*G02B 7/02* (2006.01)
(52) U.S. Cl. .................................. 359/819; 359/811
(58) Field of Classification Search ................ 359/811, 359/618–621, 626, 720, 724–726, 733, 745; 250/208.1, 216, 578.1; 396/111, 113, 432; 362/268, 335, 338; 257/432
See application file for complete search history.

(56) References Cited

U.S. PATENT DOCUMENTS

| | | | | |
|---|---|---|---|---|
| 5,023,725 | A * | 6/1991 | McCutchen | 348/38 |
| 6,954,310 | B2 * | 10/2005 | Holloway et al. | 359/619 |
| 7,286,295 | B1 * | 10/2007 | Sweatt et al. | 359/619 |

* cited by examiner

*Primary Examiner*—Hung X Dang
(74) *Attorney, Agent, or Firm*—Wang Law Firm, Inc.; Li K. Wang

(57) ABSTRACT

A multi-image retrieving system includes lenses of multiple image retrieving units arranged close to one another with a virtual boundary of filed field keeping a given spacing in parallel with that of an abutted lens without overlapping from each other to combine into a large scope of filed angle of photography and an image retrieved by an individual lens being processed using an image processor to display an image picture achieves the purpose of minimizing blind spots on both sides, expanding filed angle and image retrieving scope, and maintaining normal reproduction of the image retrieved.

3 Claims, 4 Drawing Sheets

MULTI-IMAGE RETRIEVING SYSTEM

BACKGROUND OF THE INVENTION (a) Field of the Invention

The present invention is related to a multi-image retrieving system, and more particularly, to one that minimizes blind spot; expends visual field, and image retrieving scope, and maintains images retrieved in keeping normal reproduction effects.

(b) Description of the Prior Art

The purpose of a photographic device is to take advantage of a lens of a video camera to retrieve image of an object. For example, a backing car image monitor system has a video camera installed at a rear bumper or license plate so that a driver may observe the view behind his/her vehicle right from a car-laden monitor to facilitate baking the car.

However, the field angle from a lens of the video camera usually is related to a sector that creates blind spots on both sides. Consequently, a region of image that can be retrieved by the lens of the video camera gets narrower for the view that is closer to the rear of the car; and blind spots on both sides get relatively larger to affect safety in backing the car.

Improvement attempting to overcome the problem has been made by changing the lens of ordinary field angle into a wide-angle lens to pay comparatively larger area of image that can be retrieved and blind spots on both sides get significantly smaller. However, the image retrieved when displayed on the monitor is subject to serious distortion due to excessively greater field angle to fail reproducing the normal image, i.e., the image becomes difficult to identify while leaving only the center view of the image that can be identified, resulting in distorted sense of real distance of the view behind the car. Furthermore, it is much expensive to afford a wide-angle lens.

SUMMARY OF THE INVENTION

The primary purpose of the present invention is to provide a multi-image retrieving system with multiple lenses of an image retrieving module arranged closed to one another wherein a virtual boundary of field angle of one lens maintains a given spacing from and a position in parallel with that of another lens without overlapping so to combine multiple field angles into one with larger coverage of photographic angle of field; and the image individually retrieved by each lens is processed using an image processor to display a picture of the image this to achieve the purpose of minimizing blind spots on both sides, expanding field angle and image retrieving scope, and maintains image retrieved in keeping normal reproduction effects.

To achieve the purpose, the present invention includes multiple, and two preferred, image retrieving modules with each module comprised of one image sensor and one lens; each lens is assigned to individually take image in one direction; and each image sensor respectively sends an image signal; all lenses are arranged close to one another while a virtual boundary of field angle of one lens maintains a given spacing from and a position in parallel with that of another lens without overlapping so to combine multiple field angles into one with larger coverage of photographic angle of field.

DETAILED DESCRIPTION OF THE PREFERRED EMBODIMENTS

Figure 1:
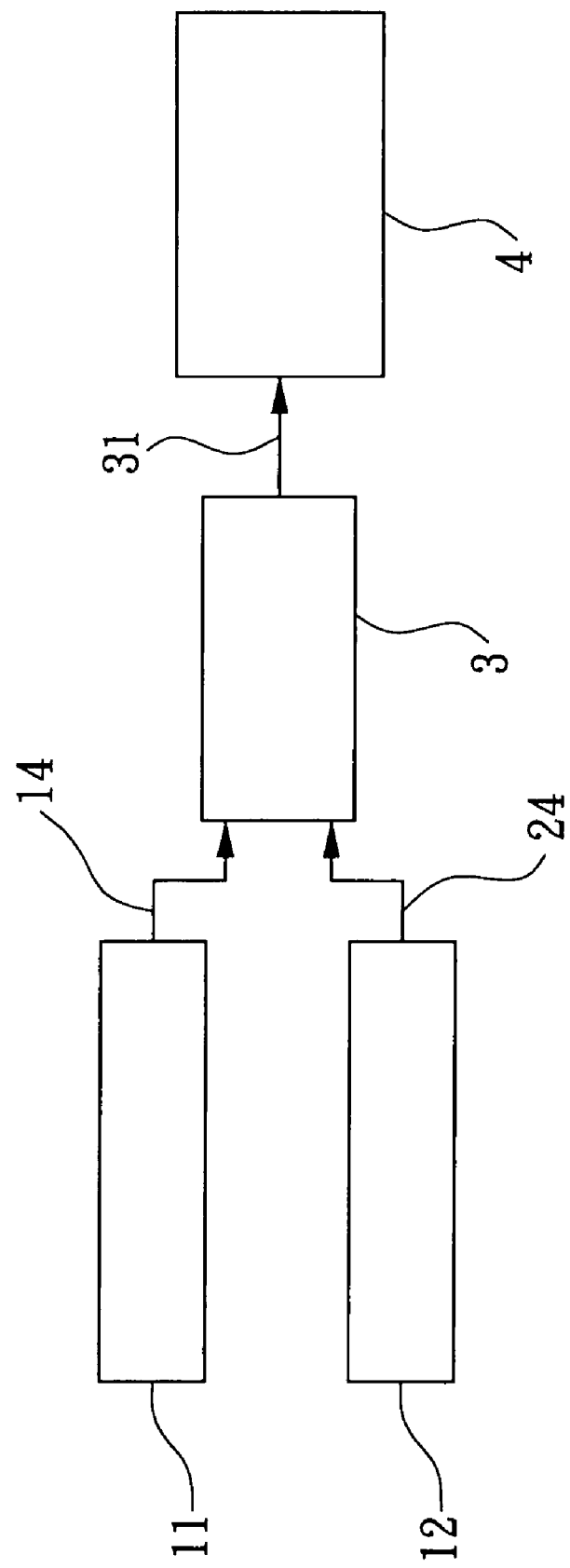
FIG. 1 is a system block chart showing a preferred embodiment of the present invention.
Figure 2:
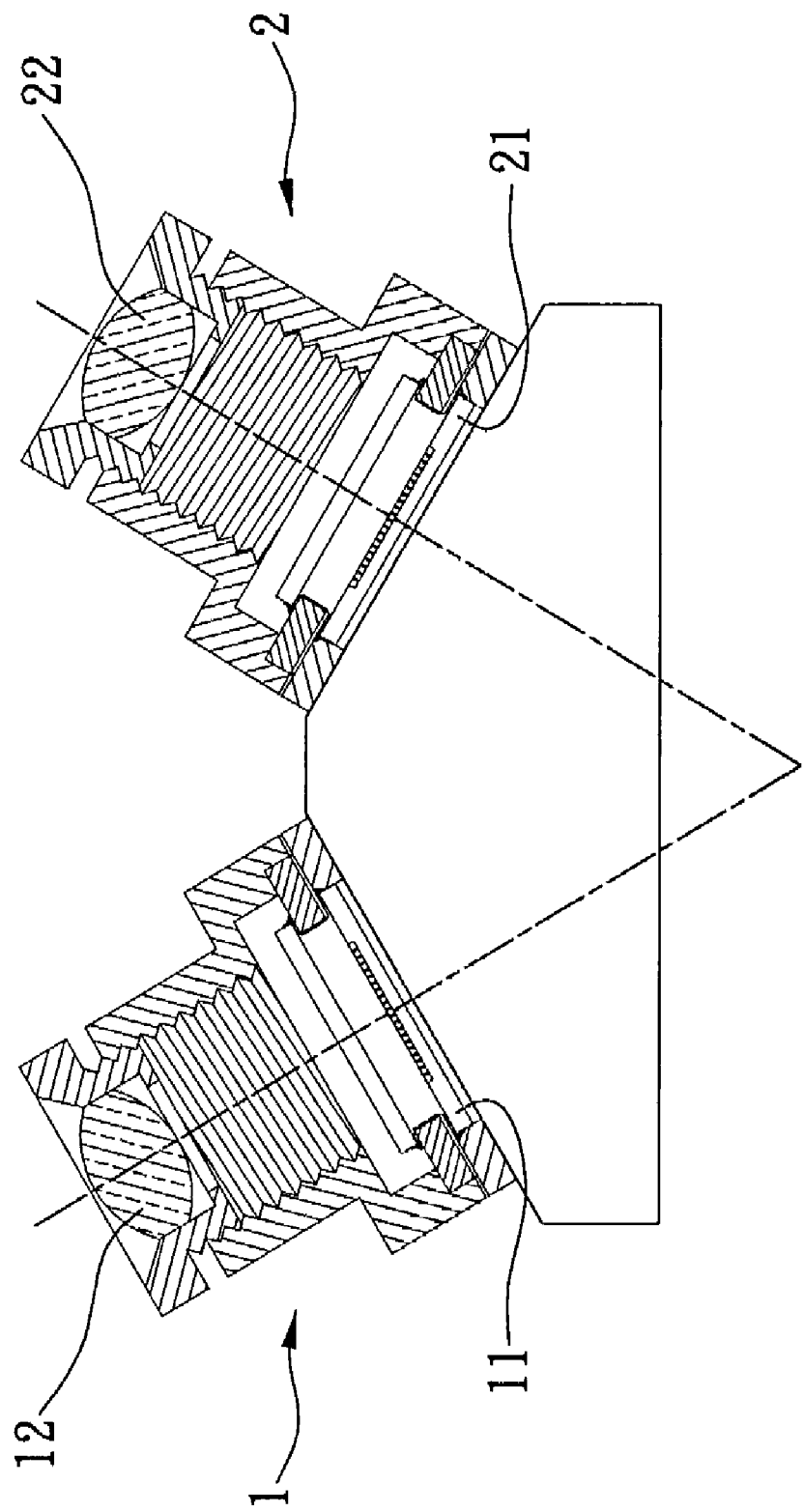
FIG. 2 is a schematic view showing a construction of an image retrieving module of the preferred embodiment of the present invention.
Figure 3:
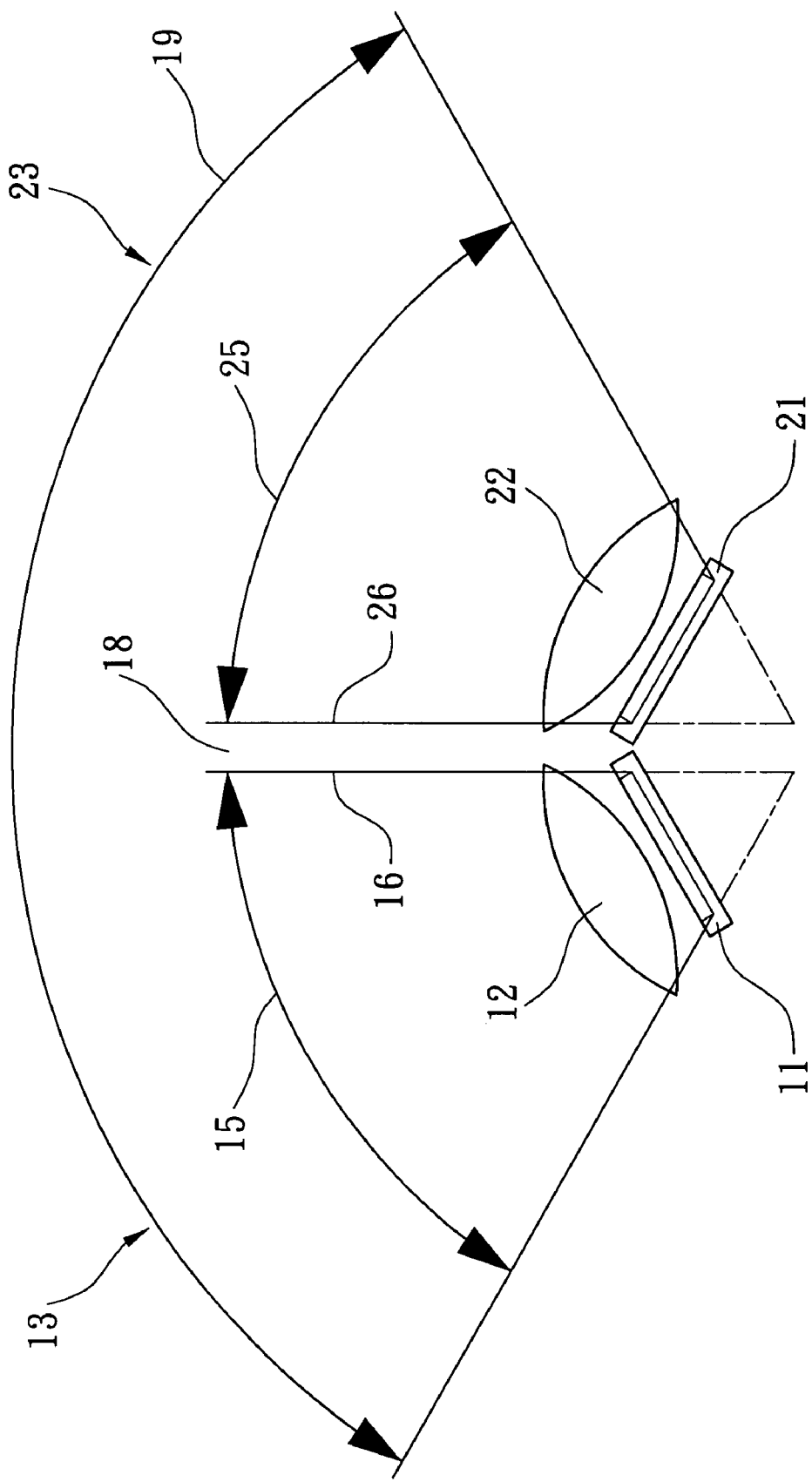
FIG. 3 is a schematic view showing that the image retrieving module of the preferred embodiment of the present invention is taking image.

Referring to FIGS. 1 through 4, a preferred embodiment of the present invention includes two image retrieving modules 1 (2); each image retrieving module 1 (2) includes an image sensor 11 (21) and a lens 12 (22); each lens 12 (22) respectively retrieves an image 13 (23) in a given direction; each image sensor 11 (22) respectively sends an image signal 14 (24); both lenses 12, 22 are arranged close to each other; a virtual boundary 16 of a field angle 15 of the lens 12 maintains a given spacing 18 with and a position in parallel with that from another virtual boundary 26 of a field angle 25 without overlapping to combine into an is angle filed 19. In the preferred embodiment, the angle filed of the lens 12 and that of the lens 22 are identical to each other; and each lens 12 (22) is related to a non wild-angle lens.

The multi-image retrieving system further includes an image processor 3 electrically connected to both image sensors 11, 12 to respectively receive inputs of image signals 14, 24 transmitted from both image sensors 11, 12; those image signals 14, 24 internally processed by the image processor 3 are combined into an image picture signal 31 and outputted to a monitor 4, which is electrically connected to the image process 3, where receives and replay the input of the image picture signal for display.

Figure 4:
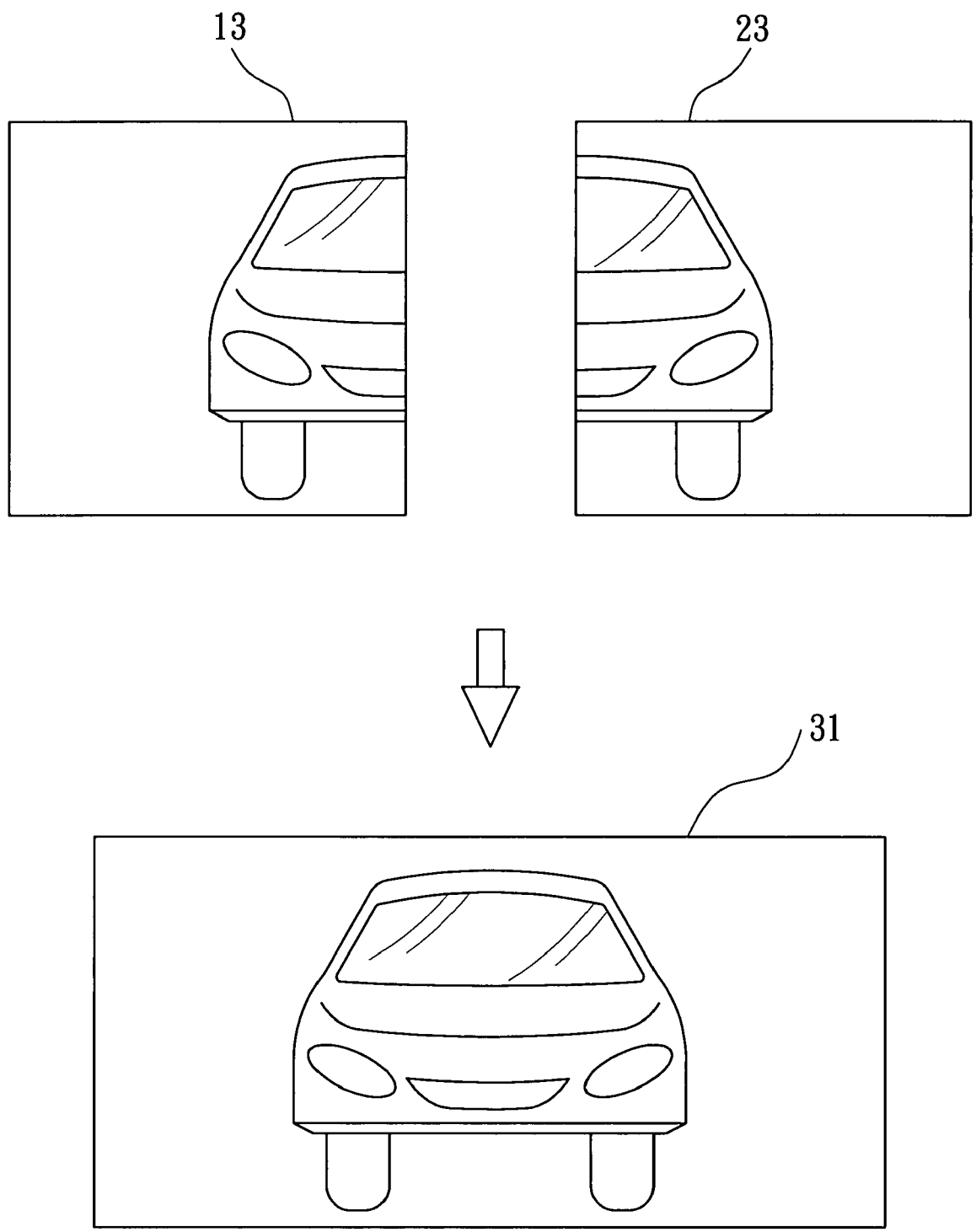
FIG. 4 is a schematic view showing a monitor of the preferred embodiment of the present invention is displaying an image retrieved.

When the present invention is applied in a backing car monitor system, two image retrieving modules 1, 2 are taken to represent multiple image retrieving modules. A lens 12 of the image retrieving module 1 is assigned to retrieve scenery as an image 13 in a given direction behind the car and an image sensor 11 of the image retrieving module 1 sends a signal 14 of the image to an image processor 3 while another lens 22 of the image retrieving module 2 retrieves scenery as another image 14 in another direction behind the car and an image sensor 12 of the image retrieving module 2 sends another image signal 24 to the same image processor 3; and both image signals 14, 24 are internally processed in the image processor 3 to be combined into an image picture signal 31 for display on a monitor 4 for a driver upon backing his/her car to have a full and complete view of the scenery behind the car as illustrated in FIG. 4 in making just in time judgment.

The present invention by having lenses of multiple image retrieving units arranged close to one another with a virtual boundary of filed field keeping a given spacing in parallel with that of an abutted lens without overlapping from each other to combine into a large scope of filed angle of photography and an image retrieved by an individual lens being processed using an image processor to display an image picture achieves the purpose of minimizing blind spots on both sides, expanding filed angle and image retrieving scope, and maintaining normal reproduction of the image retrieved.

Furthermore, the present invention helps effective cost reduction when compared to the prior art installed with a wide-angle video camera.

The prevent invention provides an improved structure of a multi-image retrieving system light guide construction for direct type backlight module, and the application for a patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A multi-image retrieving system comprising:
   image retrieving modules;
   each image retrieving module including an image sensor and a lens;
   each image sensor being assigned to take image in a given direction and send an image signal; and
   all lenses being arranged close to one another a virtual boundary of field angle of a lens being kept a given spacing in parallel with one another without being overlapped to combine a field angle of photography.

2. The multi-image retrieving system as claimed in claim 1, wherein each from all the lenses has the same field angle.

3. The multi-image retrieving system as claimed in claim 1, wherein the system is further comprised of an image processor electrically connected respectively to each image sensor; the image sensor receives input of image signal from each lens; image signal received is then processed in the image processor; all image signals processed are combined into an image picture signal and outputted to a monitor; the monitor is electrically connected to the image processor to receive input of the image picture signal and replay.

* * * * *